Dec. 24, 1963  J. A. RICKARD  3,115,576
METHOD OF CONTROLLING WELL FLUID CIRCULATION
BY RADIOACTIVATION OF FLUID ELEMENTS
Filed July 31, 1959
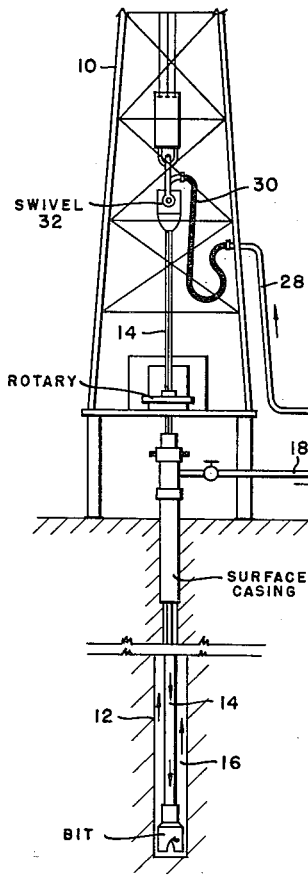
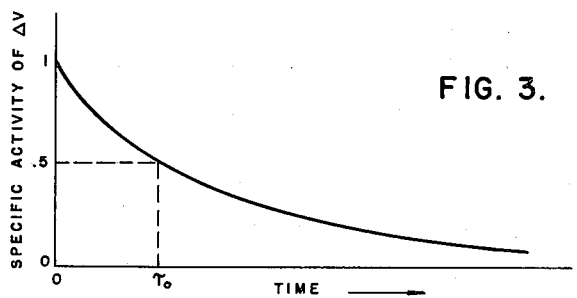
FIG. 3.
FIG. 1.
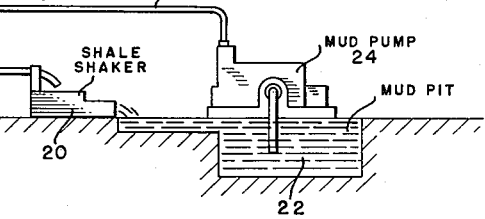
FIG. 4.
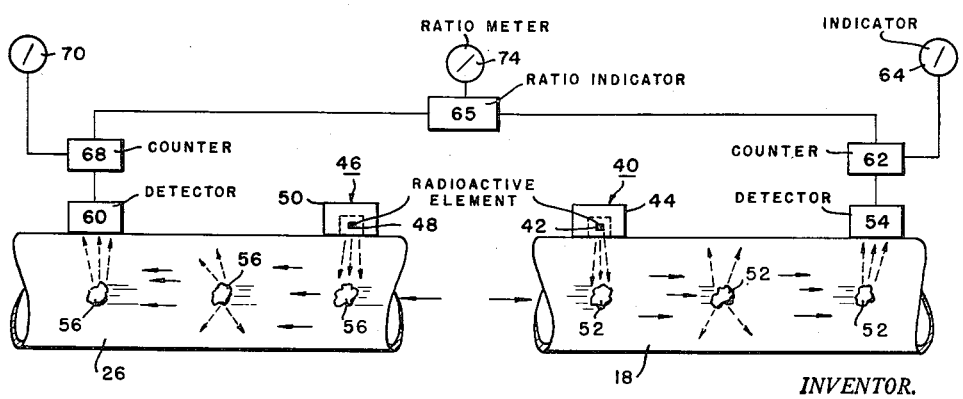
FIG. 2
INVENTOR.
JAMES A. RICKARD,
BY
Frank S. Troidl
ATTORNEY.

United States Patent Office 3,115,576
Patented Dec. 24, 1963

3,115,576
METHOD OF CONTROLLING WELL FLUID CIRCULATION BY RADIOACTIVATION OF FLUID ELEMENTS
James A. Rickard, Houston, Tex., assignor, by mesne assignments, to Jersey Production Research Company, Tulsa, Okla., a corporation of Delaware
Filed July 31, 1959, Ser. No. 830,912
6 Claims. (Cl. 250—43.5)

This invention relates to the determination of conditions within a well which is being drilled by the rotary drilling method wherein drilling mud is circulated into and out of the well bore.

In drilling boreholes with a drill using the rotary drilling technique, slush or mud pumps are operated to force mud into the well bore at a definite rate. If all the conditions within the well are normal, the rate of discharge of the mud is substantially the same as the input rate. However, if abnormal conditions should begin to appear within the well, the input rate of drilling fluid and/or the output rate of the fluid will change. Therefore, it is desirable at all times to know the rate of discharge of drilling fluid as compared with the rate of drilling fluid input into the well.

The first evidence of a potential blowout very often is unusually large volumes of mud flowing out of the well. This can occur as the mud is diluted by the entrance of salt water or gas from the subsurface formations. This contamination reduces the hydrostatic weight of the column of drilling fluid and may lead to a blowout condition. Quick recognition of this potential trouble is imperative in preventing and controlling blowouts.

In other situations, the mud may lose large amounts of water or other liquids by filtration. In another situation, the formation is broken down and whole mud may flow into the formation. This is evidenced by a reduced volume of mud flowing out of the hole. Early recognition of this condition makes easier the task of correcting it.

My new method and apparatus for carrying out the method immediately determines the existence of an unbalanced condition of the circulating fluid. That is, the amount of drilling mud entering the well bore and the amount of drilling mud leaving the well are compared and any change in the ratio of input to output is immediately indicated. Elements capable of becoming radioactive upon bombardment by nuclear particles are either added to the drilling mud or included as a weighting material within the drilling mud. A source of nuclear bombarding particles is mounted on the outside of the mud fluid output pipe. Downstream, a detecting device is also mounted on the outside of the drilling fluid output pipe to detect the activity induced in the previously bombarded elements. Likewise, a source of nuclear bombarding particles is mounted on the outside of the drilling fluid input pipe with a detector located downstream from the point at which the drilling fluid input is bombarded with nuclear particles. Means are connected to both the detectors for automatically comparing the decay of the bombarded particles in the input pipe and the output pipe. The decay in radioactivity is inversely proportional to the rate of flow of the drilling fluid. Hence, any change in rates of flow in the input and the output is evidenced by a change in the ratio of decay or relative activity which is indicated by an indicator connected to the comparing circuit.

The new system used in carrying out my new method is situated entirely outside of the flow of fluid through the circulating system. No part of the system is physically situated within the pipes. Hence, no disruption or interference with the flow of fluids is occasioned. Also, my new system for carrying out my new method does not have any moving parts which may wear out. Moving parts are particularly subject to being worn where the fluid is abrasive or moves with high velocity.

The entire system is located above the borehole. Hence, it is unnecessary to include parts of the system within the borehole. Also, the means for automatically comparing the ratio of drilling mud input to drilling mud output may be located on the drilling platform within constant view of the drilling operator.

The invention as well as its many advantages may be further understood by reference to the following detailed description and drawings in which:

FIG. 1 shows a section through a borehole with a derrick mounted above the borehole and illustrating the manner in which rotary drilling is performed;

FIG. 2 is a schematic drawing partly in block diagram showing one manner of carrying out my method and new apparatus therefor; and FIGS. 3 and 4 are graphical representations useful in illustrating the operation of the invention.

Referring specifically to FIG. 1, a derrick 10 equipped for rotary drilling is shown. A borehole 12 is being drilled by means of a bit attached to a drill pipe 14. Mud flows from the drill-borehole annulus 16 through a mud output pipe 18. The mud flows through the shale shaker 20 into mud pits 22. From mud pits 22 the mud goes to a mud pump 24 and thence through input pipe 26 through standpipe 28, rotary hose 30, and swivel 32 through the interior of the drill pipe 14. The mud travels down the drill pipe 14 to the bottom of the well and up the annulus 16 to mud return line 18.

The physical principle upon which this invention is based is that certain elemental isotopes can be made radioactive by bombardment by certain nuclear particles. These artificially created elements may have long lives or short lives, depending upon their inherent nature. In this invention, those having half-lives of the order of a few seconds are utilized.

Once having been made radioactive, the elements decay by a process which is statistically predictable. Further, each element in its decay emits radiation having a characteristic energy. These energies are well known and have been tabulated in recent Reviews of Modern Physics and in other publications.

In practicing my new method, a given volume of fluid is made radioactive by bombardment by certain nuclear particles. This particular volume moves along in its regular flow path and becomes less and less radioactive with time. A detector placed downstream a specified distance detects the characteristic radiation emitted by the decaying element. If the flow rate is fast, the radioactive volume moves to the detector quickly and produces a large number of counts. If the flow rate is slow, the volume takes longer to get to the vicinity of the detector, and hence the counting rate is lower.

It is necessary either to add some particular isotope to the mud system or to take advantage of an isotope which is already in the system. The element may be added easily to the fluid itself or by means of appropriate surface active agents to the surface of the clays themselves. Either arrangement may have merit in particular situations. The sodium which is naturally present in the clays forming the mud or in chemicals used to treat the mud or oxygen in the water which forms the fluid phase of the mud may be used as the isotope.

A preferred reaction would be as follows:

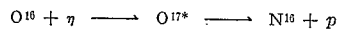

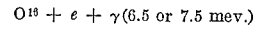

The $N^{16}$ has a half-life of 7.3 sec. and emits a gamma ray of very high energy. The detector can be set to count only those gamma rays having energies above about 6 mev. and thus eliminate the noise resulting from activity induced in other elements bombarded by the neutrons.

FIG. 2 shows schematically simplified elements of the invention. A radioactive source 40 is mounted on the mud output pipe 18 and comprises a radioactive element 42 and a radiation shield 44. Likewise, a radioactive source 46 is mounted on the mud input pipe 26 and comprises a radioactive element 48 and a radiation shield 50. The radioactive sources 40 and 46 may be sources of neutrons such as PoBe or RaBe, which are commercially available. They may be particle accelerators. They may also be one of a number of well-known gamma ray or beta ray sources.

An element having a volume 52 flows through the mud return line 18, emitting radiation characteristic of the elements within the elemental volume 52. By the time elemental volume 52 reaches a position adjacent to detector 54, it is less radioactive by a factor dependent upon, among other things, the flow rate.

Similarly, volume 56 in the input line 26 is made radioactive by the nuclear parts 58. The activity of elemental volume 56 is detected by detector 60 as it flows past detector 60.

Detectors 54 and 60 may be one of a number of conventional designs such as a Gieger counter, ionization chamber, scintillation counter, etc.

It is necessary to choose both an element of proper half-life and an appropriate spacing between the radioactive source and the detector so that the instrument has desirable sensitivity. In general, radioactive elements having a half-life ranging from 0.1 to 100 seconds may be utilized. Examples of such radioactive elements are $P^{34}$, $O^{16}$, $O^{19}$, $Na^{25}$, $F^{20}$, $N^{16}$, $O^{14}$, and $Li^9$. The distance of detector 54 from source 40 and detector 60 from source 46 may preferably range from 1 to 100 feet. Preferably, the distance between source 40 and detector 54 and the distance between source 46 and detector 60 are made substantially the same.

The characteristic emitted radiation detected by detector 54 is counted in counting equipment 62. It may be displayed upon visual indicator 64 or monitored by ratio or difference indication equipment 65.

Similarly, the characteristic emitted radiation detected by detector 60 is counted in counting equipment 68. This may be displayed upon visual indicator 70 or monitored by ratio or difference indicator equipment 65.

The output from equipment 65 may be connected to a visual indicator such as meter 74 which indicates the ratio or difference of the activity detected by detector 54 and the activity detected by detector 60. Counting equipment 62 and 68 and ratio or difference indicating equipment 65 are well known to those skilled in the art and have been described in textbooks such as Seely's Electron Tube Circuits at pages 246–251 and 632–634 (second edition).

The decay of a radioactive volume with time is shown in FIG. 3. At the instant the volume is exposed to radiation source, it has a maximum specific activity (emits a maximum number of characteristic radiations). The specific activity decays with time. When the specific activity is half its original value, the corresponding time is referred to as the half-life of the particular decay reaction monitored.

The radioactivity detected by the detectors 54 and 60 are of a form similar to that shown in FIG. 4. This figure shows how the flow rate of the fluid can be determined by measuring the characteristic radiation induced by nuclear bombardment.

Preferably, ratio meter 74 and indicators 64 and 70 are located on the drilling platform within view of the driller who controls the drilling operations.

In operation, the driller continuously or intermittently reads the ratio meter 74 or indicators 64 and 70. If formation fluid should begin to flow into the well, the mud flow out of the hole is greater than the flow into the hole. A high ratio of mud returning to mud flowing in, therefore, may be indicative of a potential blowout, and correction measures begun. When fluid is lost to the formation, the ratio meter 74 will read low, indicating that more fluid is flowing into the hole than is flowing out of the hole, and correction measures begun.

Various modifications in the above-described method and apparatus may be made without departing from the scope of the appended claims.

I claim:

1. In the drilling of wells by the rotary method where a balanced circulation of drilling fluid is maintained during drilling, the method of determining any unbalancing of the circulating fluid which comprises the steps of artificially creating radioactive elements in the drilling fluid input and output, detecting the decay of said radioactive elements in the input and output, and automatically comparing the decay in the input and decay in the output.

2. A method in accordance with claim 1 wherein the artificially created radioactive elements have a half-life ranging from 0.1 to 100 seconds.

3. In the drilling of wells by the rotary method where a balanced circulation of drilling fluid is maintained during drilling, the method of determining any unbalancing of the circulating fluid which comprises the steps of adding a material to the circulating drilling fluid having an isotope capable of being made radioactive by bombardment with nuclear particles, bombarding said material in the drilling fluid input path and in the drilling fluid output path, detecting the activity of said material at points downstream from the bombardment areas, and automatically comparing the activity of said material at each of the detecting points.

4. A method in accordance with claim 3 wherein the artificially created radioactive elements have a half-life ranging from 0.1 to 100 seconds.

5. In the drilling of wells by the rotary method where a balanced circulation of drilling fluid is maintained during drilling, the method of determining any unbalancing of the circulating fluid which comprises the steps of bombarding material in the drilling fluid capable of being made radioactive by bombardment with nuclear particles at points in the drilling fluid input and drilling fluid output, detecting the activity of said material at points downstream from the bombardment areas, and automatically comparing the activity of said material at each of the detecting points.

6. A method in accordance with claim 5 wherein the artificially created radioactive elements have a half-life ranging from 0.1 to 100 seconds.

References Cited in the file of this patent

UNITED STATES PATENTS

| | | |
|---|---|---|
| 2,290,408 | Crites | July 21, 1942 |
| 2,640,936 | Pajes | June 2, 1953 |
| 2,658,284 | Arps | Nov. 10, 1953 |
| 2,659,046 | Arps | Nov. 10, 1953 |
| 2,751,505 | Anderson | June 19, 1956 |
| 2,826,700 | Hull | Mar. 11, 1958 |
| 2,841,713 | Howard | July 1, 1958 |
| 2,932,741 | McKay | Apr. 12, 1960 |
| 2,936,371 | White et al. | May 10, 1960 |
| 2,942,741 | Ausman | June 28, 1960 |
| 2,943,045 | Hull et al. | June 28, 1960 |
| 2,957,986 | Quigg | Oct. 25, 1960 |

OTHER REFERENCES

Ryle: Gamma Density Controls Extraction Column, reprinted from Chemical Engineering Progress, November 1957, pp. 551–555.